Figure 5:
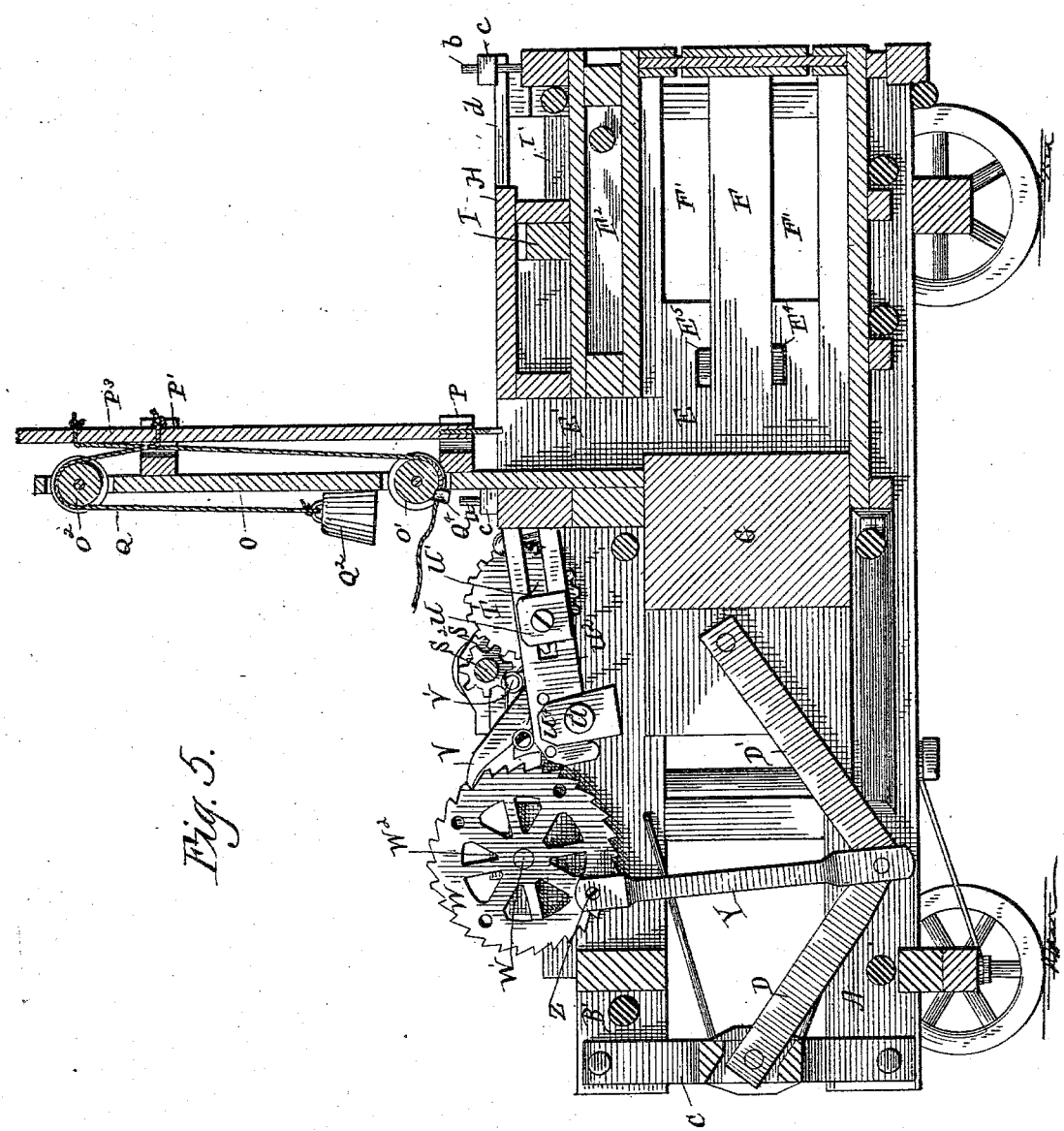

(No Model.)
F. X. MAURER.
BALING PRESS.
No. 303,305. Patented Aug. 12, 1884.
6 Sheets—Sheet 1.
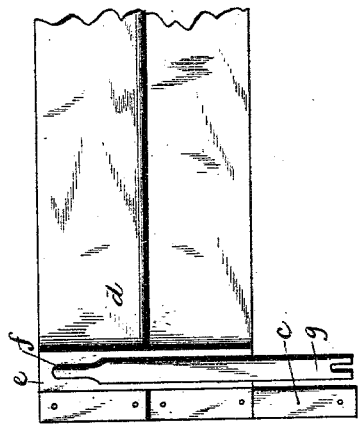
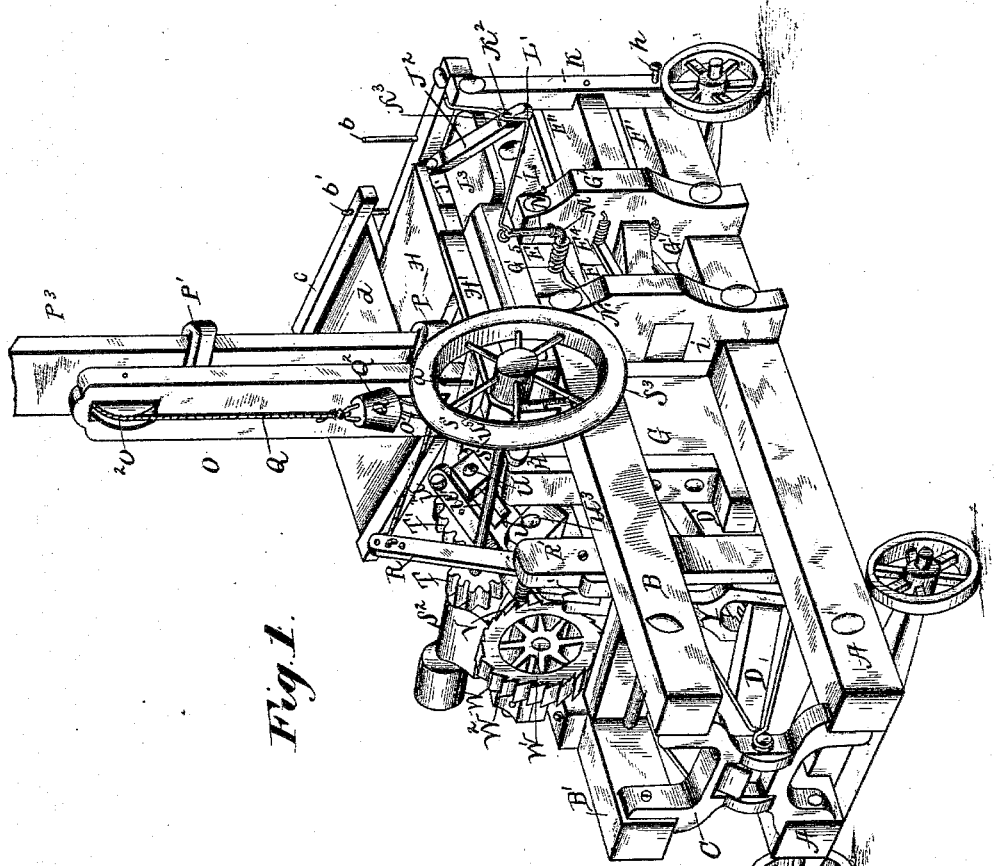
Witnesses:
C. W. Dashiell.
E. G. Siggers.
Inventor:—
Frank X. Maurer
by C. A. Snow & Co.
Attorneys.

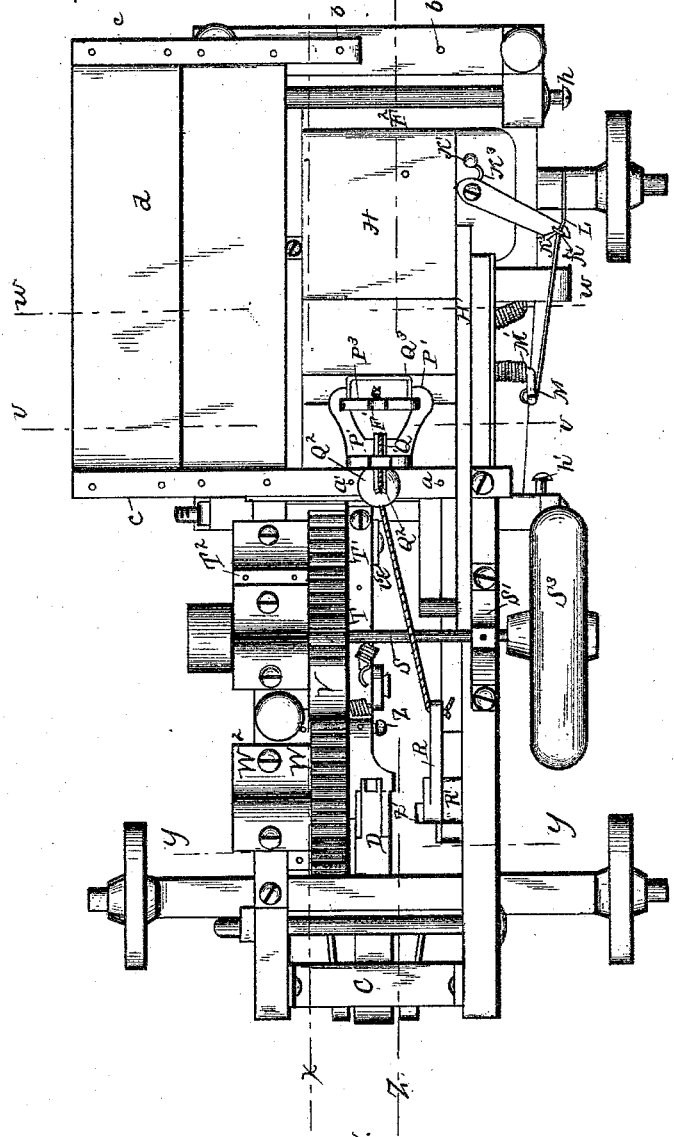

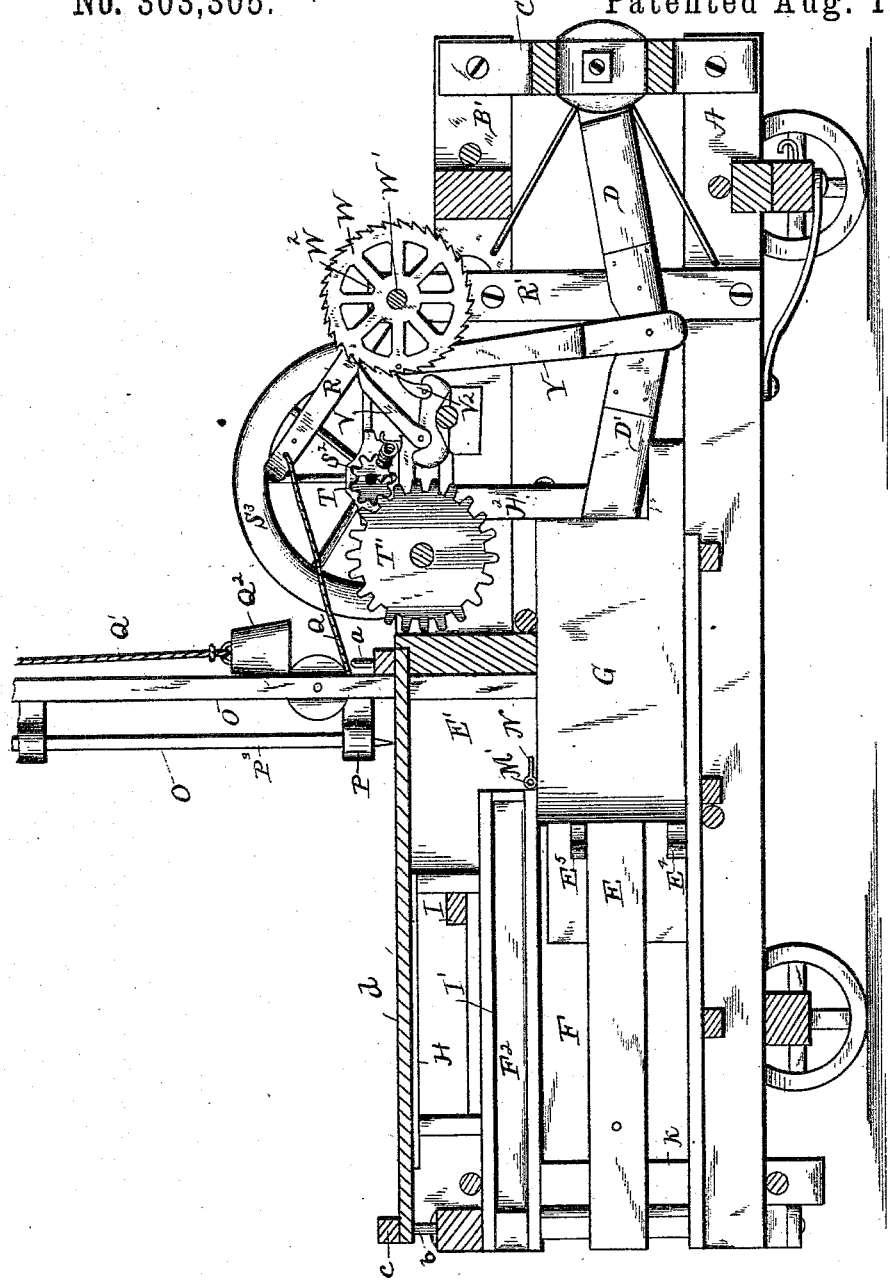

(No Model.)  6 Sheets—Sheet 4.
F. X. MAURER.
BALING PRESS.
No. 303,305. Patented Aug. 12, 1884.
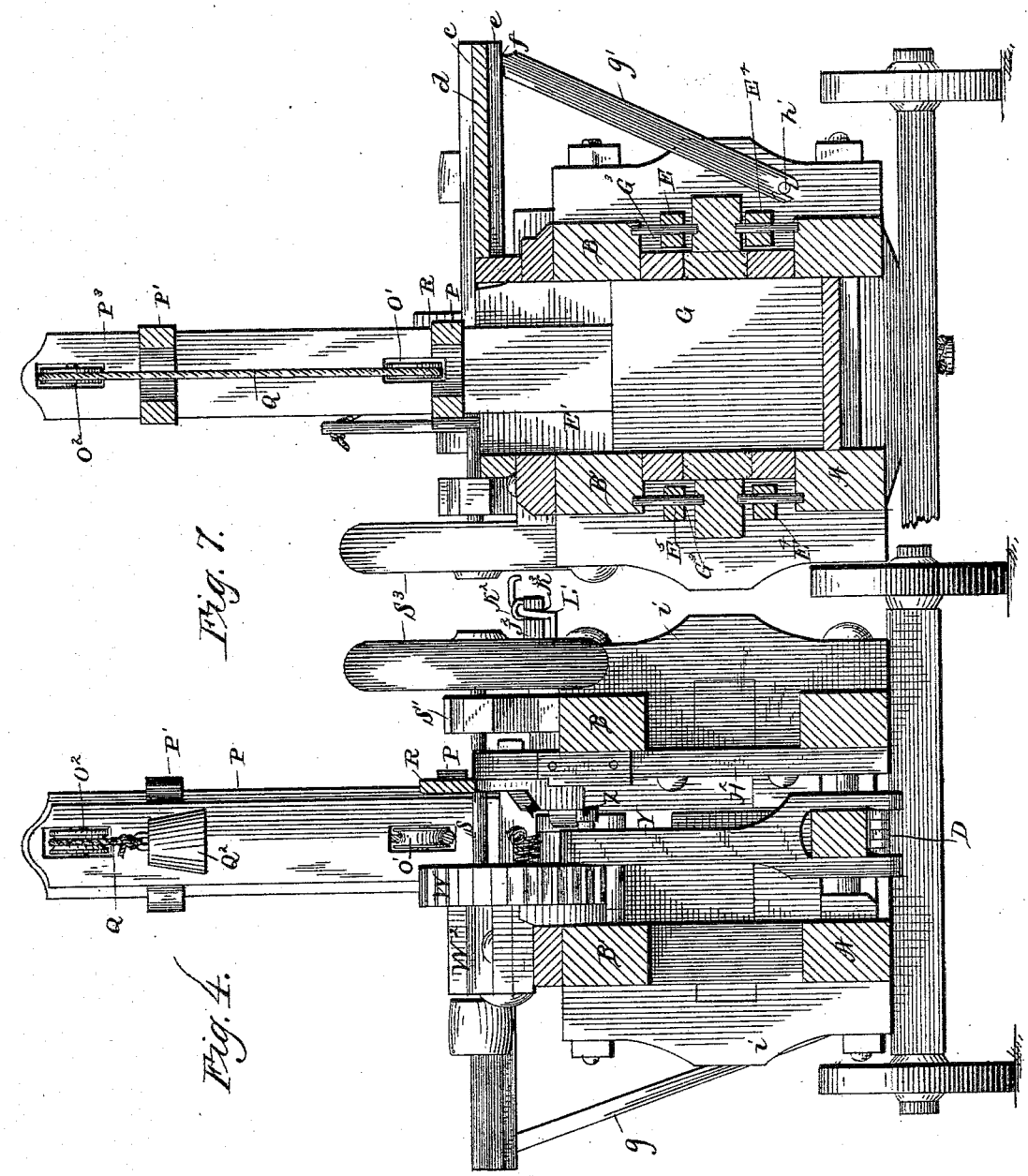
WITNESSES
N. N. Mortimer
E. G. Siggers
Frank X. Maurer
INVENTOR
by C. A. Snow & Co.
Attorney (No Model.) 6 Sheets—Sheet 5.
F. X. MAURER.
BALING PRESS.

No. 303,305. Patented Aug. 12, 1884.

WITNESSES
Frank X. Maurer
INVENTOR
by C. A. Snow & Co.
Attorneys

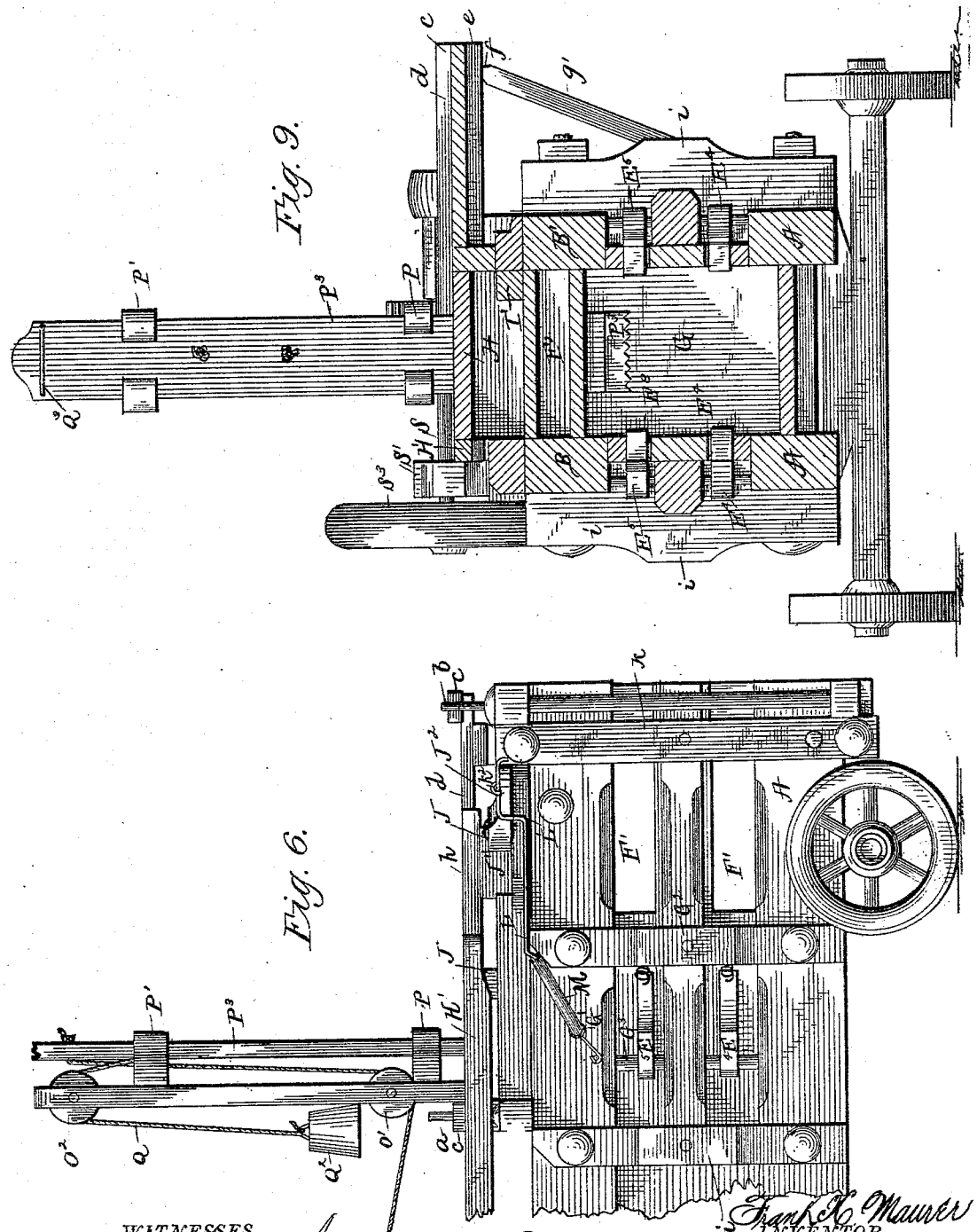

UNITED STATES PATENT OFFICE.

FRANK XAVIER MAURER, OF SPENCER, IOWA.

BALING-PRESS.

SPECIFICATION forming part of Letters Patent No. 303,305, dated August 12, 1884.

Application filed June 18, 1884. (No model.)

*To all whom it may concern:*

Be it known that I, FRANK X. MAURER, a citizen of the United States, residing at Spencer, in the county of Clay and State of Iowa, have invented a new and useful Baling-Press, of which the following is a specification, reference being had to the accompanying drawings.

This invention has relation to baling-presses for baling hay, straw, moss, &c.; and it consists in the construction and novel arrangement of parts, as will be hereinafter fully described, and particularly pointed out in the claims.

Figure 1 is a view in perspective of a baling-press embodying my improvements. Fig. 2 is a plan view. Fig. 3 is a vertical sectional view on the line $x\,x$ in Fig. 2. Fig. 4 is a transverse vertical section on the line $y\,y$ in Fig. 2, at a time when the rammer is projected down into the press-box, and just before the weight drops to lift the rammer from the press-box. Fig. 5 is a vertical longitudinal section on the line $z\,z$ in Fig. 2, after the weight has fallen and raised the rammer. Fig. 6 is a side elevation of the left side of the baling-press, showing a portion broken away. Fig. 7 is a transverse vertical section on the line $v\,v$ in Fig. 2; and Fig. 8 is a partial bottom view of the table with the table-leg inserted in place. Fig. 9 is a transverse section on line $w\,w$, Fig. 2.

Referring by letter to the accompanying drawings, the sills A A of the frame of the baling-press are secured on the rear axle and the head-block of the front axle of the running-gear, and form the reaches for the running-gear, thereby rendering the baling-press portable. The sills A A are separated by suitable strips, and are strongly connected by bolt-rods and nuts. The girders B B' are also strongly connected to their cross-beams by bolts and nuts. The sills A A are connected to the girders B B' at the front end of the frame by a support, C, nearly X form, the middle portion of which support forms the bearing for the front toggle-arm, D. The uprights for the press-box E and bale-chamber F also connect the sills and girders, and additional uprights may be used and the arrangement of those mentioned may be varied without departing from the spirit of the invention, the object being to construct the frame, press-box, and bale-chamber very strong and durable, so that great power may be applied when the material is being formed into bales. The press-box E and bale-chamber F are really one compartment; but I denominate them as above to distinguish the part into which the material is fed through an opening, E', in its top side, and that part in which the follower G works, from the part which has openings F' F' at its sides, and in which the bale is formed and tied, with two wires only. The sides of the press-box E are solid, except where they are perforated a short distance from their rear ends at $E^2\,E^3$, to receive the inwardly-projected ends of the pivoted spring-stops $E^4$ $E^5$, the said stops being pivoted on vertical rods $G^3$, having bearings in the frame outside of the press-box, (see Fig. 6,) and pressed to place by springs G' secured to the outer faces of the arms of said stops at their rear ends, and connected to the uprights $G^2$ of the press-box. These stops project only slightly within the press-box, and are intended to prevent the material, after it has been pressed into the bale-chamber, from following the follower when it is withdrawn.

The top side, $F^2$, of the bale-chamber F is made nearly as thick as the girders B B', its upper face being nearly flush with their upper faces, its lower face being a short distance above the lower faces of the girders, and it is securely bolted between them. The top side. $F^2$, of the bale-chamber F extends about half-way over the press-box E, and forms the top side of the press-box E as far forward as the feed-opening E' of the press-box E.

Above the top side, $F^2$, is the follow-board H, which is connected by a horizontal arm, H', to a vertical arm, $H^2$, connected to the follower G near its connection with the toggle-arm D'. Upon the top side, $F^2$, of the bale-chamber is secured a transverse strip, I, which is recessed near each end for the reception of the guide-rails I' I' of the feed-follower, connected at their ends by cross-strips J J; and the follow-board is secured upon the frame thus formed, thereby producing a feed-follower for the press-box E. The horizontal arm H' is connected to the right edge of the follow-board H, near its front, and to the right side of the vertical arm H². Near its rear end, on its right, the feed-follower is provided with a short bearing, J', which engages a pivoted lever, J², pivoted on a horizontal plate, J³, secured to the girder B. The normal position of the lever J² is at a right angle to the length of the frame, and a spring, K, secured in place by a stud, K', holds it in this position when it has been released by the bearing J' at the rear of the follow-board. The outer end of this lever J² is provided with a staple, K², on its upper face and a vertical seat, K³, in its forward edge. Through the staple passes a rod, L, bent downward at its rear end, and provided with a downward vertical bend, L', forward from its rear end a distance equal to about one-third of the length of the rod, which bend L' rests in the vertical seat K³ when the lever J² is in its normal position. The bent rod L is hinged at its forward end to the upper end of an arm or crank, M, on the right end of a rock-shaft, M', which traverses the feed-opening E' of the press-box immediately in front of and at the lower side of the top F² of the bale-chamber. This rock-shaft M' is provided within the feed-opening E' with a metal compressor-plate, N, which, when operated, compresses the material that has been fed into the feed-opening down into the press-box. The rock-shaft M' is provided at its crank end with a coil-spring, N', secured to the outer face of the girder B at one end, and to the crank M of the rock-shaft M' at the other end, the intermediate portion of the spring N' being coiled around the projecting end of the rock-shaft between the crank-arm and the girder B. This spring N' holds the compressor-plate N in its normal position, which is a vertical position, with the free edge of the plate upward.

At the front end of the feed-opening E' is secured an upright, O, which is provided with a pulley, O', a short distance above the feed-opening E', and with a pulley, O², near the top of said upright O. This upright O is provided with two guide-brackets—one, P, below the pulley O', and one, P', below the pulley O²—in which a rammer, P³, works when the baling-press is in operation. A rope, Q, connects with the rammer P³ at a point about opposite the upper pulley, O², of the upright O, and runs under the pulley O' and forward to a cam-lever, R, pivoted to a standard, R', at right side of the frame on the inner faces of the sill and girder of that side, and is connected to the top of said lever R, which is perforated so the rope may be adjusted. A rope, Q', is also connected to the rammer P³ at a point below the connection of the rope Q with the rammer, and runs up over the pulley O² and down near to the pulley O', (in the normal position of the rammer,) and is provided with a weight, Q², at its lower end. The foot of the rammer is serrated, and a stop, Q³, is provided near its upper end, to prevent it from passing entirely through the upper guide-bracket in its descent into the press-box. The rope Q is provided with a stop-block, Q⁴, which regulates the distance the weight falls.

The driving-shaft S of the baling-press has its bearings in boxes S' S² on the girders B B', a short distance in front of the press-box, and is provided on its left end with a band-pulley, and on its right end with a fly-wheel, S³. The shaft S is provided with a pinion, T, which meshes with a cog-gear wheel, T', journaled in a box, T², on the girder B'. This cog-gear wheel T' is provided with an eccentric wrist-pin, U, which passes through a slot, U', in the eccentric lever U², which is pivoted on a shaft, U³, in bearings U⁴ secured to the inner face of the girder B'. The wrist-pin U is provided with a washer, U⁵, which slides on the face of the eccentric lever U². The lever U² is provided near its journaled end with an upper longer pivoted pawl, V, controlled by a spring, V', and a lower shorter pivoted pawl, V², controlled by a spring, V³. These spring-pressed pawls V and V² engage the teeth of a large ratchet-wheel, W, fixed on a shaft, W', journaled in a box, W², on the girder B'. This ratchet-wheel W is provided with a wrist-pin, X, which projects entirely through the upper end of the eccentric-rod Y, which is connected at its lower bifurcated end with the joint of the toggle-arms D D'. The projecting end Z of the wrist-pin X of the ratchet-wheel W in making its circuit strikes the cam Z' on the lower end of the lever R, and causes the rammer P³ to descend at the proper time.

Vertical studs $a\ a'\ b\ b'$ are provided, two rising from the end wall of the press-box and two from the upper rear cross-piece of the frame, with two of which, either $a\ b$ or $a'\ b'$, the perforated projecting arms $c\ c$ of the table $d$ engage, so that the table may be placed at either side of the machine. The under face of the table $d$ is provided with cleats $e$, which are provided near their outer ends with sockets $f$ for the upper ends of the legs $g$. The lower ends of the legs $g$ are bifurcated, and slip over the stems of headed studs $h\ h'$ in the uprights $i\ k$ of the frame. The leg $g'$ is made shorter than the leg $g$ as a matter of convenience.

The press is in its normal position when the eccentric-rod Y extends vertically across the face of the ratchet-wheel W.

The material to be baled is fed from the table into the feed-opening E', part of it falling upon that part of the top F² which is exposed at the start. The driving-shaft may be rotated in either direction, the ratchet-wheel rotating always in one direction. The pinion and cog-gear wheel operate the eccentric lever and it communicates the motion through the spring-pawls to the ratchet-wheel, the latter conveying the motion through the wrist-pin and eccentric-rod Y to the toggle-arms D D', which operate the follower G. The follower G at the start to feed is at its rearward limit within the press-box, and the toggle-arms are nearly in the same plane with each other. When the upper end of the eccentric-rod Y has moved a distance of about forty-five degrees, the follower G and follow-board or feed-follower H begin to move forward—i. e., toward the front end of the machine. The follow-board H moves over the top side, F², of the bale-chamber and sweeps any material that may lie thereon into the feed-opening. As the follow-board H moves forward the bearing J' engages the cam end of the lever J² and moves that end forward, causing the lever J² to turn on its fulcrum and carries its forward end backward, its staple sliding on the bent rod L until it strikes the bent end of said rod, at which time the bearing J' will have moved forward far enough to permit the cam end of the lever J² to slip over its rear end, when the spring K will return the lever J² to its normal position against the vertical bend L' on the rod L. At this time the projecting end Z of the wrist-pin X engages the cam Z' of the lever R, and moves the lower end of the lever R toward the rear of the machine, causing the upper end of the lever R to describe an arc toward the front of the machine, and draw the rope Q with it, which causes the rammer P³ to descend and ram the material down into the press-box, and at the same time draws the weight Q² up to the pulley O², near the top of the upright O. When the wrist-pin X has carried the upper end of the eccentric-rod Y past the half-revolution about seventeen and one-half degrees, the cam Z' slips from the projecting end of the wrist-pin X, and the weight Q² falls and carries the lever R and rammer P³ back to their normal positions. At this time the follower G is at its limit toward the front of the machine, and the follower and follow-board H commence immediately to move toward the rear of the machine. As the bearing J' on the follower-board reaches the cam end of the lever J² it turns the lever forward on its pivot. The vertical seat K³ of the lever L bears against the vertical bend L' of said rod, and moves the rod L forward, and causes the crank M to turn the rock-shaft M' forward, thereby turning the compressor-plate N down forward upon the material in the feed-opening E', and compressing it in the press-box F. The follower G then moves toward the material in the press-box, and at the same time the follower-board H recedes from the feed-opening, and the bearing J' bears against the cam end of the lever J², until just before the follower-board H reaches its normal position, when the cam end of the lever L slips from the bearing J', and the coil-spring N' returns the compressor-plate N and lever J² to their normal positions. When the follower G reaches the spring-stops E⁴ E⁵ in the press-box it forces them outwardly and presses the material beyond them toward the rear of the bale-chamber. After a sufficient number of charges have been compressed within the bale-chamber to nearly complete the bale, the material has a tendency to expand when the follower leaves it. As soon as the follower recedes from the material, the spring-stops E⁴ E⁵ project inwardly through their perforation, and the material moving forward engages and is stopped by them. It will be seen from the foregoing description that the press feeds the material to the bale-chamber intermittently, and forms the bale in layers, which makes it convenient when necessary to cut the bale for consumption. The crank M is stopped at the proper time to prevent the compressor-plate N coming with too great force against the end of the top side, F², of the bale-chamber, by its crank M, striking on a beveled shoulder, m, on the upright G² at the right side of the bale-chamber. The standard R' is provided with a shoulder, R², on its inner face at its forward edge, which prevents the upper end of the lever R from being thrown too far down toward the rear end of the machine when the weight Q² falls.

The follower G slides on guides n n on the inner faces of the sills A A, until it reaches the floor of the press-box F. The vertical arm H², secured to the forward end of the follower G, is provided with a shoulder, H³, which engages and slides on a guide, p, on the inner face of the girder B. The mouth of the feed-opening E' is built upon the left side above the girder B', by securing a vertical top board, q, thereto, and on the right side by securing to the girder B a strip, r, which comes up nearly to the under face of the horizontal arm H'. The rear end of the bale-chamber is closed by a removable door, s, while the bale is being formed, and the bale is removed through the open rear end of the bale-chamber after having been formed. The bale-chamber possesses slight adjustability, the adjustments being effected by tightening or loosening the nuts on the four bolts at the rear of the frame.

This baling-press works accurately and rapidly, and possesses great power and durability.

When the press is in operation, the press-box and feed-opening open quickly, causing the ratchet-wheel to slip half-way around when the eccentric-arm on the face of the ratchet-wheel is across the center of center rod of ratchet-wheel. This slip is caused by the material in the press-box giving the follower a start after the material has been pressed, thereby causing the ratchet-wheel to gain motion. The weight of the toggle-arms will carry the follower back.

Having thus fully described my invention, what I claim as new, and desire to secure by Letters Patent of the United States, is—

1. The combination, with the frame of the baling-press provided with the bearings, substantially as described, of the driving-shaft having the band-pulley pinion and fly-wheel, the cog-gear wheel provided with the eccentric wrist-pin engaging the pinion on the shaft, the slotted eccentric lever provided with the longer and shorter spring-pawls engaging the teeth of the large ratchet-wheel, the ratchet-wheel, the eccentric-rod connected to the wrist-pin in the rim of the ratchet-wheel, and the toggle-arms and follower of the press, substantially as specified.

2. The combination, with the frame, the follower provided with the vertical shouldered arm $H^2$, and mechanism, substantially as described, for operating the follower, of the follow-board H, provided with the bearing $J^2$, and connected to the arm $H^2$ by the horizontal arm $H'$, the pivoted spring-pressed cam-lever $J^2$, provided at its outer end with the staple and vertical seat, the bent rod L, having the vertical bend $L'$ connected to the crank M of the rock-shaft, and the spring-pressed rock-shaft provided with the compressor-plate N in the press-box, substantially as specified.

3. The combination, with the frame, the ratchet-wheel W, provided with the wrist-pin X, having projecting end Z, passed through the upper end of the eccentric-rod Y, and mechanism, substantially as described, for operating the ratchet-wheel, follower, and follow-board, of the upright O, having pulleys $O'$ $O^2$ and guide-brackets P and $P'$, the ropes Q and $Q'$, the former provided with a stop-block, the weight $Q^2$, and the lever R, fulcrumed to the standard $R'$, provided with a stop, $R^2$, and cam $Z'$ on the lower end of lever R, substantially as specified.

4. The combination, with the frame of the press, press-box, follower G, and mechanism, substantially as described, for operating the follower, of the spring-stops $E^4$ $E^5$, projecting inwardly through perforations in the sides of the press-box near their rear ends, the arms of said stops being pivoted on vertical rods $G^3$ outside of the press-box, and their ends being pressed inwardly by springs $G'$, secured to the outer faces of said arms and to the uprights $G^2$ of the press-box, substantially as specified.

5. The combination, with the frame of the baling-press having the front wall of the press-box and the upper rear cross-piece of frame provided with the vertical studs $a$ $a'$ $b$ $b'$, and the headed studs $h$ $h'$ in the uprights $i$ $k$, of the table $d$, having the perforated arms $c$ $c$ and the cleats $e$ $e$, with sockets $f f$ and the legs $g$ $g'$, bifurcated in their lower ends to engage the headed studs, substantially as specified.

6. The combination, with the frame of the baling-press, of the bale-chamber E, provided with the four bolts, two of which pass vertically and two pass horizontally through the timbers at the rear end of the press-frame, and the nuts, whereby the bale-chamber is made adjustable, substantially as specified.

7. The combination, with the frame and press-box, and mechanism, substantially as described, for operating the lever R, of the lever R, provided with the cam $Z'$ at its lower end and perforations at its upper end, the rope Q, provided with the stop-block, the upright O, having pulleys $O'$ $O^2$ and guide-brackets P $P'$, the rope $Q'$, having weight $Q^2$, and the rammer $P^3$, having serrated foot and a stop near its upper end, substantially as specified.

8. The combination, with the frame, of the ratchet-wheel W, having wrist-pin X and projection Z, the eccentric-rod Y, the slotted eccentric lever $U^2$, provided with the pivoted spring-pawls V $V'$ $V^2$ $V^3$, the cog-gear wheel $T'$, having the eccentric wrist-pin U, and mechanism, substantially as described, for operating the eccentrics, as set forth.

In testimony that I claim the foregoing as my own, I have hereto affixed my signature in presence of two witnesses.

FRANK XAVRER MAURER.

Witnesses:
R. TROENDLE,
J. J. MAURER.